(12) United States Patent
Fujiwara et al.

(10) Patent No.: US 9,690,744 B2
(45) Date of Patent: Jun. 27, 2017

(54) INFORMATION PROCESSING APPARATUS AND METHOD FOR HOT PLUG

(71) Applicant: FUJITSU LIMITED, Kawasaki-shi, Kanagawa (JP)

(72) Inventors: Ikuroh Fujiwara, Kawasaki (JP); Kensuke Ishida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 14/504,752

(22) Filed: Oct. 2, 2014

(65) Prior Publication Data
US 2015/0019785 A1 Jan. 15, 2015

Related U.S. Application Data

(63) Continuation of application No. PCT/JP2012/062332, filed on May 14, 2012.

(51) Int. Cl.
*G06F 13/40* (2006.01)
*G06F 9/44* (2006.01)

(52) U.S. Cl.
CPC ........ *G06F 13/4081* (2013.01); *G06F 9/4411* (2013.01)

(58) Field of Classification Search
CPC .................................................. G06F 13/4081
See application file for complete search history.

(56) References Cited

U.S. PATENT DOCUMENTS

| 5,680,288 A * | 10/1997 | Carey .................... H02H 9/004 361/115 |
| 6,058,446 A * | 5/2000 | Ichimi ................... G06F 13/387 709/220 |
| 8,078,764 B2 | 12/2011 | Okitsu et al. |
| 9,083,565 B2 * | 7/2015 | Wang ....................... H04L 12/66 |
| 2008/0065875 A1 * | 3/2008 | Thompson ............ G06F 3/0607 713/2 |

(Continued)

FOREIGN PATENT DOCUMENTS

| JP | 09-233111 | 9/1997 |
| JP | 2009-177375 | 8/2009 |

(Continued)

OTHER PUBLICATIONS

International Search Report of PCT/JP2012/062332 mailed on Jun. 5, 2012.

(Continued)

*Primary Examiner* — Nimesh G Patel
(74) *Attorney, Agent, or Firm* — Staas & Halsey LLP (57) ABSTRACT

An information processing apparatus of the embodiment includes: a data storage unit to store a virtual address in association with first information that includes at least identification information of a slot; and circuitry. And the circuitry is configured to: detect an interrupt that notifies an operating system that a first PCI card was replaced and is output from a second PCI card by which the first PCI card was replaced on a certain slot; extract, from the data storage unit, a virtual address associated with first information that includes identification information of the certain slot, upon detecting the interrupt; and set the second PCI card so as to communicate using the extracted virtual address.

9 Claims, 9 Drawing Sheets (56) References Cited

U.S. PATENT DOCUMENTS

| | | | |
|---|---|---|---|
| 2008/0098146 A1* | 4/2008 | Lee | G06F 13/24 710/269 |
| 2008/0101351 A1* | 5/2008 | Nguyen | H04L 29/12839 370/389 |
| 2010/0250717 A1* | 9/2010 | Akagi | H04L 29/12254 709/221 |
| 2011/0153905 A1 | 6/2011 | Otani et al. | |
| 2012/0011288 A1* | 1/2012 | Kanaya | G06F 13/385 710/36 |
| 2013/0055254 A1* | 2/2013 | Avasthi | G06F 9/45533 718/1 |
| 2014/0019642 A1* | 1/2014 | Yamauchi | H04L 61/6022 709/245 |

FOREIGN PATENT DOCUMENTS

| | | |
|---|---|---|
| JP | 2009-181418 | 8/2009 |
| JP | 2011-091477 | 5/2011 |
| JP | 2011-118663 | 6/2011 |
| JP | 2011-134296 | 7/2011 |
| JP | 2011-227841 | 11/2011 |

OTHER PUBLICATIONS

Written Opinion of the International Searching Authority of PCT/JP2012/062332 mailed on Jun. 5, 2012.

* cited by examiner

FIG.1

| PORT OF RELAY APPARATUS | MAC ADDRESS SET TO PORT OF RELAY APPARATUS | MAC ADDRESS OF APPLICATION SERVER | CONNECTION ALLOWED OR DISALLOWED |
|---|---|---|---|
| LAN PORT11 | MAC ADDRESS 31 | MAC ADDRESS 31 | CONNECTION ALLOWED |
| LAN PORT12 | MAC ADDRESS 32 | MAC ADDRESS 32 | CONNECTION ALLOWED |
| LAN PORT13 | MAC ADDRESS 34 | MAC ADDRESS 33 | CONNECTION DISALLOWED |

| SETTING FOR ZONING | WWN OF APPLICATION SERVER CONNECTABLE |
|---|---|
| ZONE X (STORAGE DEVICE A) | WWN1, WWN2 |
| ZONE Y (STORAGE DEVICE B) | WWN2, WWN3 |

| PCI SLOT | PORT ON PCI CARD | TYPE OF PCI CARD | VIRTUAL MAC ADDRESS | VIRTUAL WWN |
|---|---|---|---|---|
| SLOT#1 | PORT#1 | LAN | 12-e2-00-00-00 | - |
| SLOT#2 | PORT#1 | LAN | 12-e2-00-00-01 | - |
| SLOT#2 | PORT#2 | LAN | 12-e2-00-01-00 | - |
| SLOT#3 | PORT#1 | LAN | 12-e2-00-02-00 | - |
| SLOT#4 | PORT#1 | FC | - | 10:00:00:a0:98:00:00:00 |
| SLOT#4 | PORT#2 | FC | - | 10:00:00:50:76:00:00:00 |
| SLOT#5 | PORT#1 | FC | - | 10:00:00:50:76:00:00:01 |
| SLOT#6 | PORT#1 | FC | - | 10:00:00:50:76:00:01:00 |

| SERVER | PCI SLOT | PORT ON PCI CARD | TYPE OF PCI CARD | VIRTUAL MAC ADDRESS | VIRTUAL WWN |
|---|---|---|---|---|---|
| APPLICATION SERVER | SLOT#1 | PORT#1 | LAN | 12-e2-00-00-00 | - |
| APPLICATION SERVER | SLOT#2 | PORT#1 | LAN | 12-e2-00-00-01 | - |
| APPLICATION SERVER | SLOT#2 | PORT#2 | LAN | 12-e2-00-01-00 | - |
| DEVELOPMENT SERVER | SLOT#1 | PORT#1 | LAN | 12-e2-00-02-00 | - |
| APPLICATION SERVER | SLOT#3 | PORT#1 | FC | - | 10:00:00:a0:98:00:00:00 |
| APPLICATION SERVER | SLOT#4 | PORT#2 | FC | - | 10:00:00:50:76:00:00:00 |
| DEVELOPMENT SERVER | SLOT#2 | PORT#1 | FC | - | 10:00:00:50:76:00:00:01 |
| DEVELOPMENT SERVER | SLOT#3 | PORT#1 | FC | - | 10:00:00:50:76:00:01:00 |

INFORMATION PROCESSING APPARATUS AND METHOD FOR HOT PLUG

CROSS-REFERENCE TO RELATED APPLICATIONS

This application is a continuing application, filed under 35 U.S.C. section 111(a), of International Application PCT/JP2012/062332, filed on May 14, 2012, the entire contents of which are incorporated herein by reference.

FIELD

The embodiments discussed here in are related to a technique for managing an address used in communication.

BACKGROUND

If a PCI (Peripheral Components Interconnect) card and a server on which the PCI card is mounted is compatible with hot plug (also referred to hot swap), the PCI card can be replaced even though the server is in operation. When the PCI card of the server in operation is replaced, a device driver, a controller for hot plug and the like recognize a PCI card after replacement, and communication using a unique MAC address, WWN (World Wide Name) or the like that the PCI card after replacement has will begin.

By the way, a problem sometimes occurs when the server begins communication using a unique MAC address, WWN or the like that the PCI card after replacement has. For example, there's a system in which a relay apparatus such as a switch retains a MAC address, a WWN or the like of a server allowed to connect to a storage device and allows connection to the storage device only when the relay apparatus received a connection request from the server allowed to connect (for example, a system that performs zoning). In the system like this, the relay apparatus cannot determine whether the connection to the storage device is allowed or not if the MAC address, the WWN or the like of the server change because of the replacement of the PCI card. Therefore, a server whose PCI card was replaced is not allowed to connect to the storage device to which the server is normally allowed to connect.

Conventional techniques related to the management of addresses are as follows. Specifically, there is a technique in which a virtual MAC address is allocated to a virtual NIC (Network Interface Card) to communicate properly in a virtual environment. Furthermore, there's a technique in which an address conversion table for managing correspondence between a physical address and a virtual address is equipped in the virtual environment to convert an address in individual cases. However, this technique cannot address the problem that occurs if a PCI card of a server in operation is replaced.

Patent Document 1: Japanese Laid-open Patent Publication No. 2009-177375

Patent Document 2: Japanese Laid-open Patent Publication No. 2009-181418

In other words, there is no conventional technique for making it possible to prevent a communication problem that occurs after a PCI card of a sever in operation is replaced.

SUMMARY

An information processing apparatus relating to a first aspect of the embodiment includes a data storage unit to store a virtual address in association with first information that includes at least identification information of a slot; and circuitry. And the circuitry is configured to; detect an interrupt that notifies an operating system that a first PCI card was replaced, wherein the interrupt is output from a second PCI card by which the first PCI card was replaced on a certain slot; extract, from the data storage unit, a virtual address associated with first information that includes identification information of the certain slot, upon detecting the interrupt; and set the second PCI card so as to communicate using the extracted virtual address.

An information processing apparatus relating to a second aspect of the embodiment includes: a memory; and a processor configured to use the memory and execute a process, the process including; detecting an interrupt that notifies an operating system that a first PCI (Peripheral Components Interconnect) card was replaced, wherein the interrupt is output from a second PCI card by which the first PCI card was replaced on a certain slot; transmitting identification information of the certain slot and identification information of the information processing apparatus to a management apparatus that manages a data storage unit that stores a virtual address in association with first information that includes at least identification information of a slot and identification information of an apparatus, upon detecting the interrupt; and upon receiving a virtual address associated with first information that includes the identification information of the certain slot and the identification information of the information processing apparatus, setting the second PCI card so as to communicate using the received virtual address.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

A conceivable method to address a problem that occurs at the time of communication using a unique MAC address, WWN or the like that a PCI card after replacement has is to restart a server after the replacement of the PCI card and reset the MAC address, the WWN or the like. For example, firstly the server is restarted after the replacement of the PCI card. Secondly, a proper MAC address, WWN or the like is set when a BIOS (Basic Input/Output System) detects, initializes and registers devices in the process of POST (Power On Self Test). However, in this method, processing by the server have to be stopped temporarily and a service being provided are influenced.

Another conceivable method to address the problem is to switch between an active state and a standby state among plural servers and allocate a preliminarily arranged virtual address to a server in the active state. However, in this method, the plural servers have to be preliminarily arranged (In other words, redundant configuration has to be employed).

In the following embodiments, methods will be explained, in which communication is performed uneventfully even after replacement of a PCI card without restarting a server or preliminarily arranging plural servers.

Embodiment 1

Figures 1, 2:
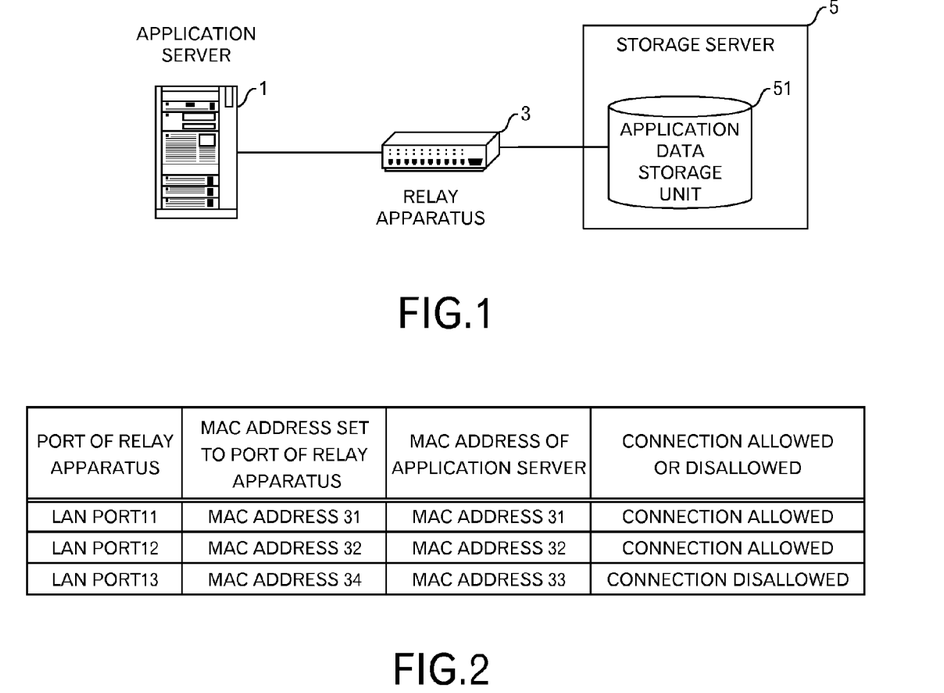
FIG. 1 is a diagram depicting a system outline of a first embodiment.
FIG. 2 is a diagram depicting a table that a relay apparatus manages.

FIG. 1 illustrates a system outline of this embodiment. A relay apparatus 3 that is, for example, a switch is connected to an application server 1 and a storage server 5 that includes an application data storage unit 51. The relay apparatus 3 determines whether the application server 1 can connect to the storage server 5 or not by using a MAC address or a WWN. In this embodiment, the application server 1 is allowed to connect to the storage server 5. The application server 1 performs processing for a service by using data stored in the application data storage unit 51 of the storage server 5. Incidentally, the relay apparatus 3 may be connected to an application server or the like other than the application server 1. However, this case is not illustrated because the application server or the like other than the application server 1 do not relate directly to a main part of this embodiment.

The relay apparatus 3 uses a table, for example, illustrated in FIG. 2 when the relay apparatus 3 determines, by a MAC address, whether the application server 1 can connect or not. The table illustrated in FIG. 2 stores identification information of a port of the relay apparatus 3, a MAC address set to the port of the relay apparatus 3, a MAC address of the application server 1, and information that represents whether connection is allowed or not. For example, the relay apparatus 3 allows connection if a MAC address included in a connection request received from LAN (Local Area Network) port 11 is MAC address 31. On the other hand, the relay apparatus 3 does not allow connection if a MAC address included in a connection request received from LAN port 13 is not MAC address 34 (For example, MAC address 33).

Figure 3:
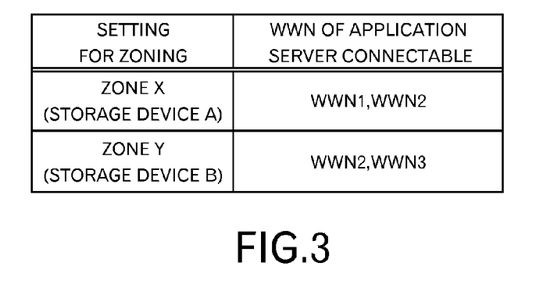
FIG. 3 is a diagram depicting a table that the relay apparatus manages.

Moreover, the relay apparatus 3 uses a table, for example, illustrated in FIG. 3 when the relay apparatus 3 determines, by soft zoning using WWN, whether the application server 1 can connect or not. The table illustrated in FIG. 3 stores identification information of a zone and a storage device in the zone, and a WWN of an application server that can connect. An application server that can connect to, for example, storage device A in zone X is an application server that has WWN1 or WWN2. Furthermore, an application server that can connect to, for example, storage device B in zone Y is an application server that has WWN2 or WWN3.

Figure 4:
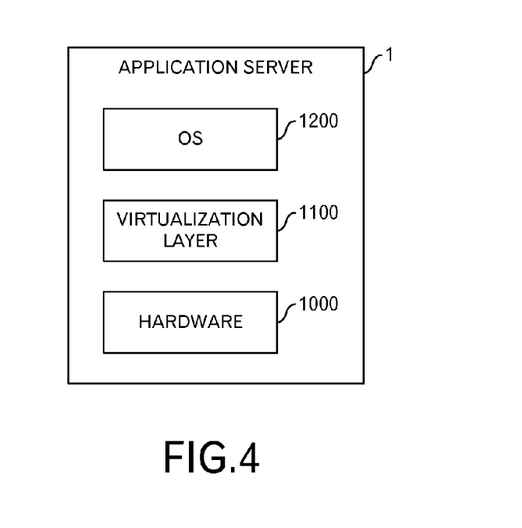
FIG. 4 is a diagram depicting a configuration of an application server.

FIG. 4 illustrates a configuration of the application server 1. The application server 1 includes hardware 1000. A virtualization layer 1100 that is a bare-metal hypervisor operates on the hardware 1000. Moreover, an OS (Operating System) 1200 operates on the virtualization layer 1100.

Figure 5:
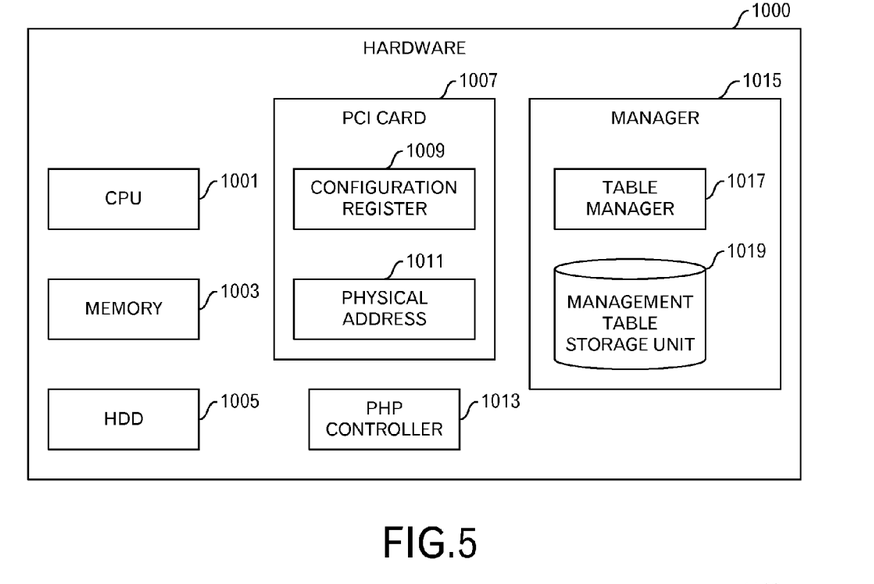
FIG. 5 is a diagram depicting a hardware configuration of an application server.

FIG. 5 illustrates a configuration of the hardware 1000 of this embodiment. The hardware 1000 includes a CPU (Central Processing Unit) 1001, a memory 1003, a HDD (Hard Disk Drive) 1005, a PCI card 1007 that includes a configuration register 1009 and a physical address 1011, a PHP (PCI Hot Plug) controller 1013, and a manager 1015 that includes a table manager 1017 and a management table storage unit 1019.

The PCI card 1007 is a LAN card or a FC (Fibre Channel) card. The physical address 1011 is a MAC address if the PCI card 1007 is a LAN card, and the physical address 1011 is a WWN if the PCI card 1007 is a FC card. The PHP controller 1013 is a controller for replacing the PCI card 1007 even though the application server 1 is in operation. The table manager 1017 performs processing by using data acquired from an acquisition unit 1107 (FIG. 6) and data stored in the management table storage unit 1019 and outputs, to a setting unit 1101 (FIG. 6), a result of the processing.

Figure 6:
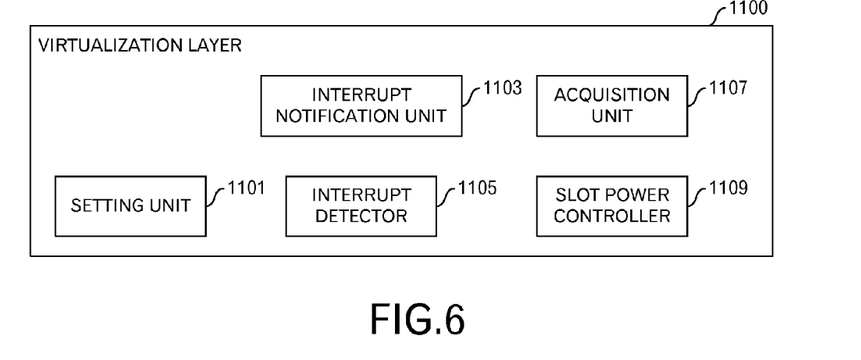
FIG. 6 is a functional block diagram of a virtualization layer.

FIG. 6 illustrates functional blocks of the virtualization layer 1100. The virtualization layer 1100 includes the setting unit 1101, an interrupt notification unit 1103, the interrupt detector 1105, the acquisition unit 1107, and a slot power controller 1109.

The interrupt detector 1105 instructs the slot power controller 1109 and the acquisition unit 1107 to perform processing when the interrupt detector 1105 detected an interrupt output from the PHP controller 1013. The interrupt notifies the OS 1200 of the replacement of the PCI card 1007. The slot power controller 1109 controls the PHP controller 1013 and powers on a PCI slot on which the PCI card 1007 after the replacement was mounted, when the slot power controller 1109 is instructed to perform the processing from the interrupt detector 1105. The acquisition unit 1107 acquires information related to the PCI card 1007 after the replacement. This processing is sometimes called PCI configuration. Moreover, the acquisition unit 1107 outputs, to the manager 1015, the information related to the PCI card 1007 after the replacement. The setting unit 1101 stores, into a predetermined area of the configuration register 1009, a virtual MAC address or a virtual WWN included in the processing result received from the manager 1015. The interrupt notification unit 1103 outputs, to the OS 1200, the interrupt detected by the interrupt detector 1105.

Figures 7, 8:
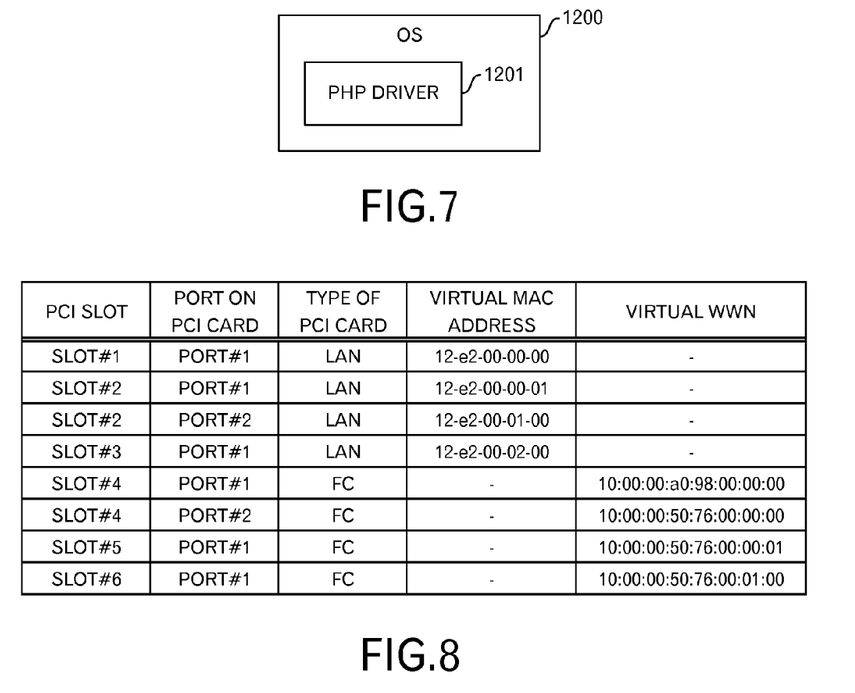
FIG. 7 is a functional block diagram of an OS.
FIG. 8 is a diagram depicting an example of data stored in a management table storage unit in the first embodiment.

FIG. 7 illustrates functional blocks of the OS 1200. The OS 1200 includes a PHP driver 1201. The PHP driver 1201 acquires information related to the PCI card 1007 after the replacement, when the PHP driver 1201 received the interrupt from the interrupt notification unit 1103.

FIG. 8 illustrates an example of data that is stored in the management table storage unit 1019. In the example in FIG. 8, identification information of a PCI slot, identification information of a port on a PCI card, a type of the PCI card, and a virtual MAC address or a virtual WWN.

Figure 9:
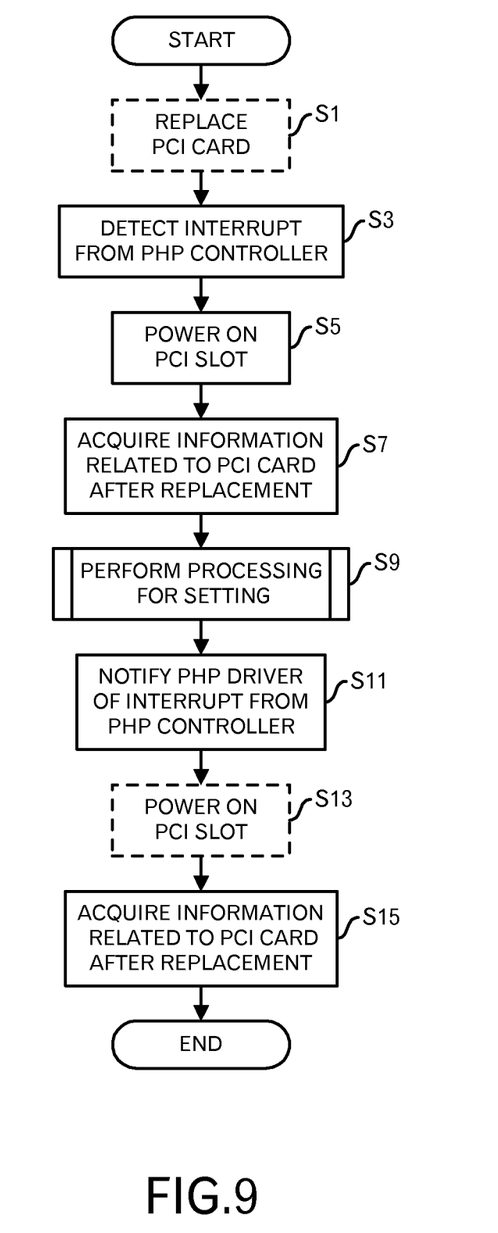
FIG. 9 is a diagram depicting a processing flow of processing performed by the application server.

Next, operations of the application server 1 will be explained using FIG. 9 and FIG. 10. First, the PCI card 1007 is replaced by an administrator of the system or the like when the application server 1 is in operation (FIG. 9: step S1). Incidentally, a block of the step S1 in FIG. 9 is represented by a dashed line because the step S1 does not represent the operation of the application server 1.

When the PCI card 1007 is replaced, the PHP controller 1013 outputs an interrupt that notifies the OS 1200 that the PCI card 1007 has been replaced. Here, the interrupt detector 1105 in the virtualization layer 1100 detects the interrupt (step S3). In the step S3, the OS 1200 does not receive the interrupt because the interrupt detector 1105 hooks the interrupt. The interrupt detector 1105 instructs the slot power controller 1109 and the acquisition unit 1107 to perform processing when the interrupt detector 1105 detected the interrupt.

When the slot power controller 1109 is instructed to perform processing from the interrupt detector 1105, the slot power controller 1109 controls the PHP controller 1013 and powers on the PCI slot on which the PCI card 1007 after the replacement was mounted (step S5).

The acquisition unit 1107 acquires information related to the PCI card 1007 after the replacement when the acquisition unit 1107 is instructed to perform processing from the interrupt detector 1105 (step S7). In the step S7, identification information of the slot on which the PCI card 1007 after the replacement was mounted, identification information of a port on the PCI card 1007 after the replacement, and a type of the PCI card 1007 after the replacement are acquired. Moreover, the acquisition unit 1107 outputs acquired information to the manager 1015.

And, the manager 1015 and the setting unit 1101 perform processing for setting (step S9). The processing for setting will be explained using FIG. 10.

Figure 10:
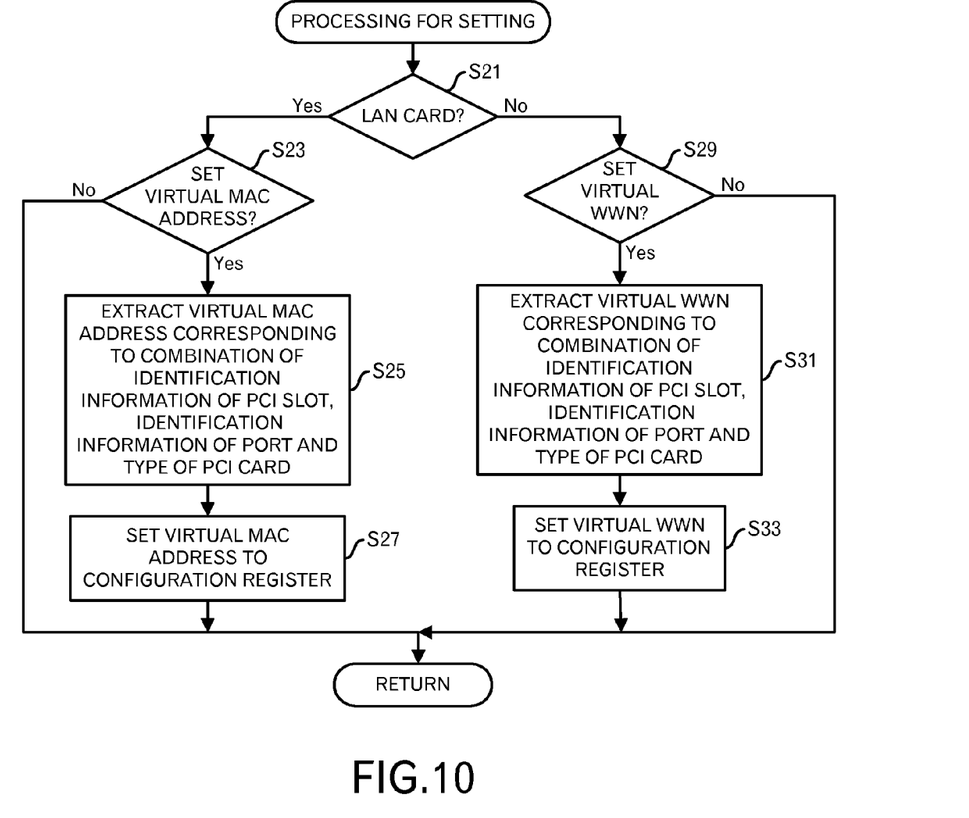
FIG. 10 is a diagram depicting a processing flow of processing for setting.

First, the table manager 1017 in the manager 1015 determines whether the PCI card 1007 after the replacement is a LAN card (FIG. 10: step S21). When the PCI card 1007 after the replacement is a LAN card (step S21: Yes route), the table manager 1017 determines whether the setting unit 1101 sets a virtual MAC address to the PCI card 1007 after the replacement (step S23). For example, when a PCI card 1007 before the replacement is also a LAN card, taking over the virtual MAC address to the PCI card 1007 after the replacement prevents occurrence of a communication problem. Therefore, the setting unit 1101 sets a virtual MAC address to the LAN card after the replacement.

When the setting unit 1101 does not set a virtual MAC address to the PCI card 1007 after the replacement (step S23: No route), processing returns to the calling source processing. On the other hand, the setting unit 1101 sets a virtual MAC address to the PCI card 1007 after the replacement (step S23: Yes route), the table manager 1017 extracts, from the management table storage unit 1019, a virtual MAC address associated with a combination of the identification information of the slot on which the PCI card 1007 after the replacement was mounted, the identification information of the port on the PCI card 1007 after the replacement, and the type of the PCI card 1007 after the replacement (step S25).

And the table manager 1017 outputs a virtual MAC address extracted in the step S25 to the setting unit 1101.

The setting unit 1101 stores the virtual MAC address received from the table manager 1017 into a predetermined area of the configuration register 1009 of the PCI card 1007 after the replacement (step S27). Then processing returns to the calling source processing.

On the other hand, when the PCI card 1007 after the replacement is not a LAN card (Namely, the PCI card after the replacement is a FC card) (step S21: No route), the table manager 1017 determines whether the setting unit 1101 sets a virtual WWN to the PCI card 1007 after the replacement (step S29). For example, when a PCI card 1007 before the replacement is also a FC card, taking over the virtual WWN to the PCI card 1007 after the replacement prevents occurrence of a communication problem. Therefore, the setting unit 1101 sets a virtual WWN to the PCI card 1007 after the replacement.

When the setting unit 1101 does not set any virtual WWN to the PCI card 1007 after the replacement (step S29: No route), processing returns to the calling source processing. On the other hand, when the setting unit 1101 sets a virtual WWN to the PCI card 1007 after the replacement (step S29: Yes route), the table manager 1017 extracts, from the management table storage unit 1019, a virtual WWN associated with a combination of the identification information of the slot on which the PCI card 1007 after the replacement was mounted, the identification information of the port on the PCI card 1007 after the replacement, and the type of the PCI card 1007 after the replacement (step S31). And the table manager 1017 outputs the virtual WWN extracted in the step S31 to the setting unit 1101.

The setting unit 1101 stores the virtual WWN received from the table manager 1017 into a predetermined area of the configuration register 1009 of the PCI card 1007 after the replacement (step S33). Then processing returns to the calling source processing.

By performing processing such as described above, it is possible for the OS 1200 to refer to the virtual MAC address or the virtual WWN stored in the configuration register 1009.

Returning to the explanation of FIG. 9, the setting unit 1101 notifies the interrupt notification unit 1103 that the setting to the configuration register 1009 has been finished. Accordingly, the interrupt notification unit 1103 outputs the interrupt detected by the interrupt detector 1105 to the PHP driver 1201 in the OS 1200 (step S11).

Here, the PHP controller 1013 tries to power on the slot on which the PCI card 1007 after the replacement was mounted (step S13). However, in this embodiment, a state of the slot does not change because the slot was already powered on in the step S5. Therefore, a block of the step S13 in FIG. 9 is represented by a dashed line.

And the PHP driver 1201 acquires information related to the PCI card 1007 after the replacement (step S15). Then processing ends. Substance of the step S15 is the same as the substance of the step S7, however, the step S7 is processing in which the virtualization layer 1100 acquires information and the step S15 is processing in which the OS 1200 acquires information.

Incidentally, processing in the steps S13 and S15 is well known as processing which the PHP controller 1013 performs when replacing the PCI card 1007. If the processing from the steps S3 to S11 is not performed, the PCI card 1007 after the replacement is recognized by the processing in the steps S13 and S15, and communication will be performed using the physical address 1011 allocated to the PCI card 1007 after the replacement.

On the other hand, by performing the processing in this embodiment, the OS 1200 refers to the virtual MAC address or the virtual WWN set to the predetermined area of the configuration register 1009. Namely, the physical address 1011 allocated to the PCI card 1007 after the replacement is not used for communication. Therefore, it becomes possible to prevent the relay apparatus 3 from failing to determine whether connection to a storage device is allowed or not. Moreover, it becomes possible to omit resetting of the relay apparatus 3 at the time of the replacement of the PCI card 1007.

Embodiment 2

Figure 11:
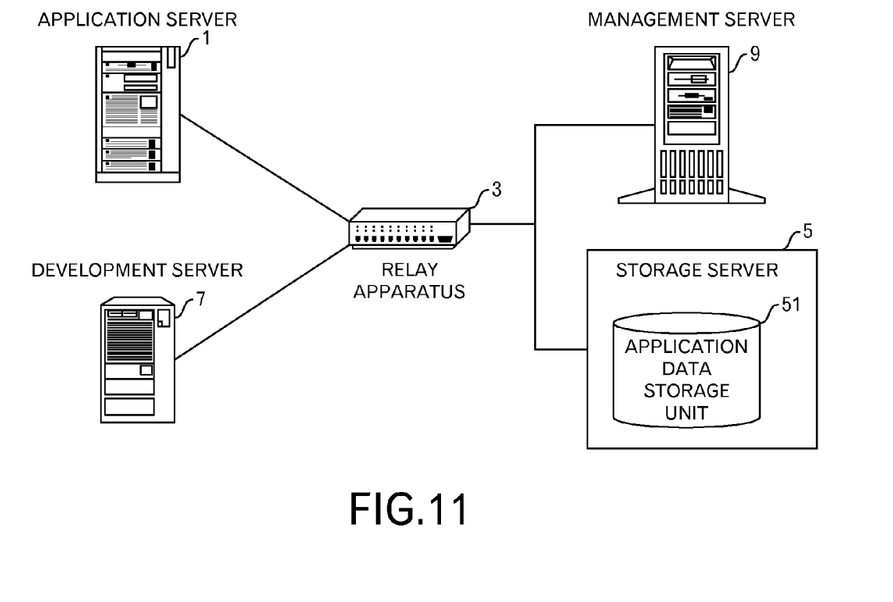
FIG. 11 is a diagram depicting a system outline of a second embodiment.

FIG. 11 illustrates a system outline of the second embodiment. A relay apparatus 3 that is, for example, a switch is connected to an application server 1, a development server 7, a management server 9, and a storage server 5 that includes an application data storage unit 51. The relay apparatus 3 determines, by using a virtual MAC address and a virtual WWN, which are explained later, whether the application server 1 and the development server 7 can connect to the storage server 5. In this embodiment, the application server 1 and the development server 7 are allowed to connect to the storage server 5. The application server 1 and the development server 7 perform processing for a service using data stored in the application data storage unit 51 of the storage server 5. Incidentally, the relay apparatus 3 may be connected to any server or the like other than the application server 1, the storage server 5, the development server 7 and the management server 9, however, this case is not illustrated because the server or the like other than the application server 1 and the storage server 5 does not directly relate to a main part of this embodiment.

Figure 12:
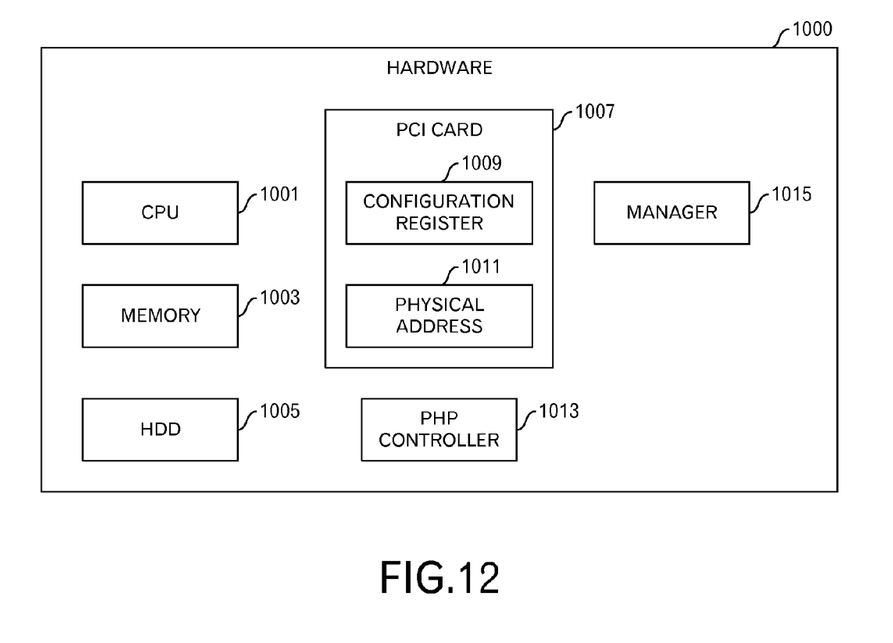
FIG. 12 is a diagram depicting a hardware configuration of a application server in the second embodiment.

A hardware configuration of the application server 1 in the second embodiment is different from that of the application server 1 in the first embodiment. FIG. 12 illustrates a configuration of hardware 1000 of the application server 1 in the second embodiment. The hardware 1000 includes a CPU 1001, a memory 1003, a HDD 1005, a PCI card 1007 that includes a configuration register 1009 and a physical address 1011, a PHP controller 1013, and a manager 1015.

The manager 1015 transmits, to the management server 9, an address extraction request that includes data received from an acquisition unit 1107 (FIG. 6). Moreover, the manager 1015 outputs a virtual MAC address or a virtual WWN received from the management server 9 to a setting unit 1101 (FIG. 6). Functions of components other than the manager 1015 are the same as those in the first embodiment.

Incidentally, an explanation about a configuration of the development server 7 is omitted because the configuration of the development server 7 is the same as that of the application server 1.

Figure 13:
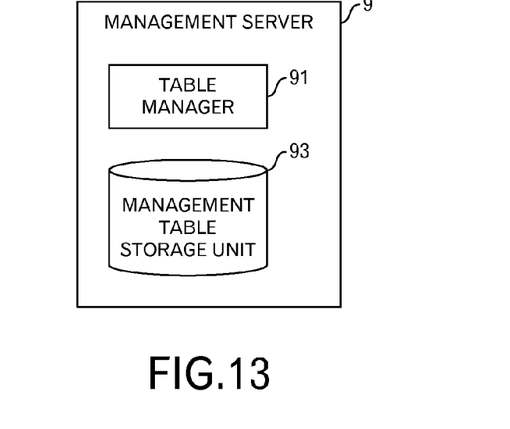
FIG. 13 is a functional block diagram of a management server.

FIG. 13 illustrates functional blocks of the management server 9. The management server 9 includes a table manager 91 and a management table storage unit 93. When the table manager 91 received the address extraction request from the application server 1 or the development server 7, the table manager 91 extracts a virtual MAC address or a virtual WWN from the management table storage unit 93 by using data included in the address extraction request as a key. And the table manager 91 transmits the extracted virtual MAC address or the virtual WWN to the application server 1 or the development server 7.

Figure 14:
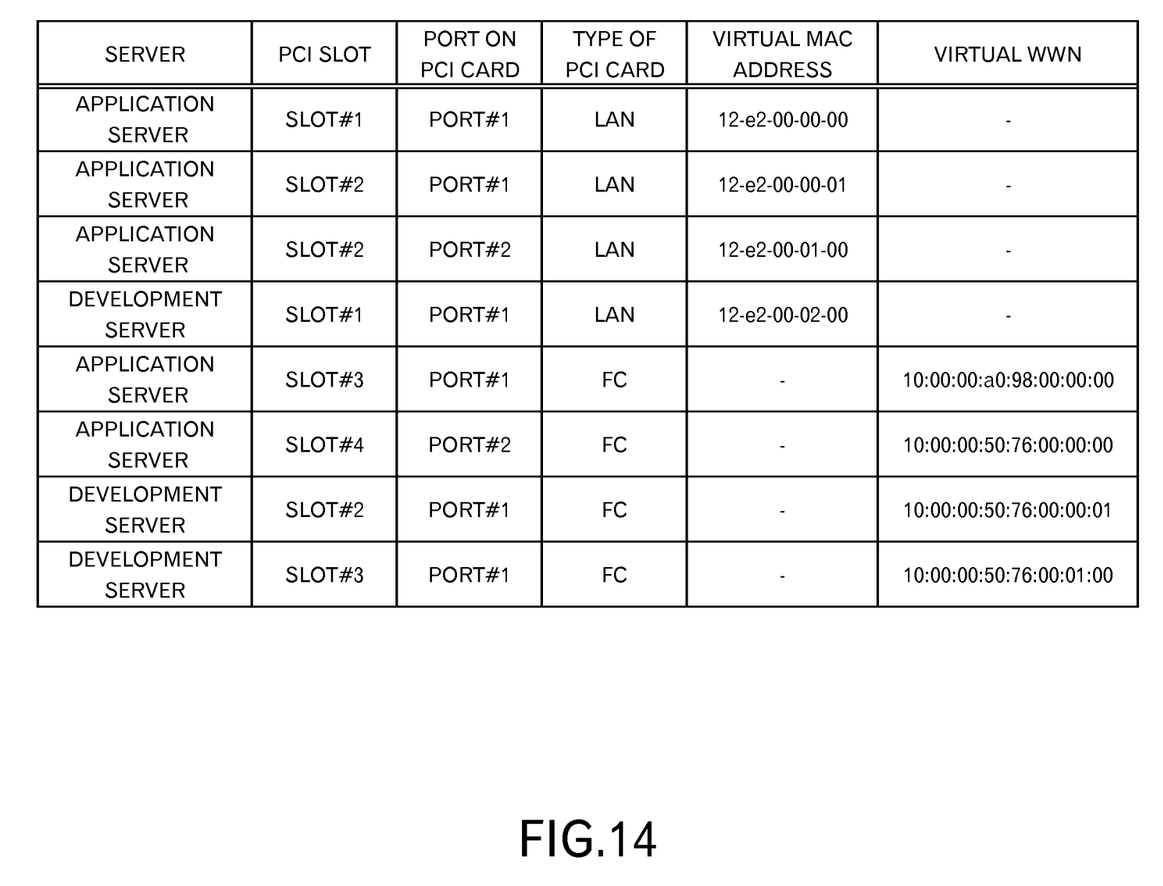
FIG. 14 is a diagram depicting an example of data stored in a management table storage unit in the second embodiment.

FIG. 14 illustrates an example of data that is stored in the management table storage unit 93. In the example in FIG. 14, the management table storage unit 93 stores identification information of a server, identification information of a PCI slot, identification information of a port on a PCI card, a type of the PCI card, and a virtual MAC address or a virtual WWN.

Next, operations of the system illustrated in FIG. 11 will be explained using FIG. 15 and FIG. 16. Here, an example in which the PCI card 1007 of the application server 1 is replaced will be explained.

Figure 15:
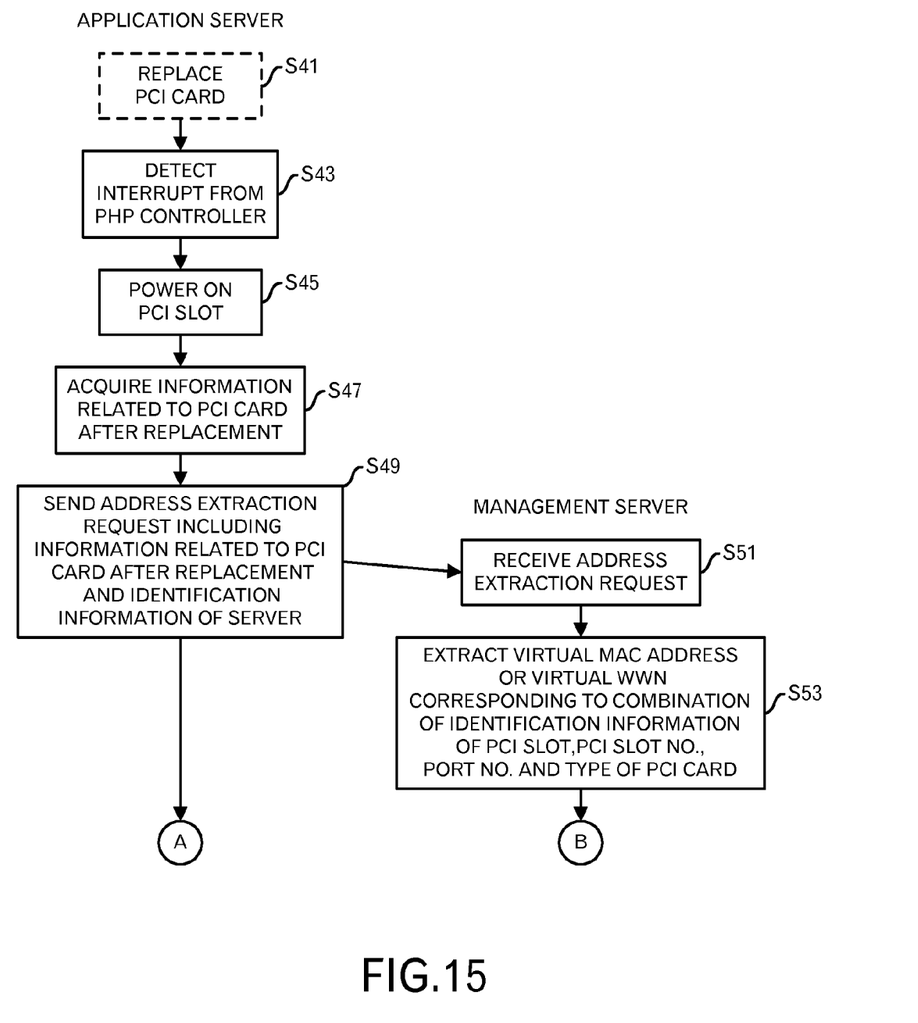
FIG. 15 is a diagram depicting a processing flow of processing performed in the system of the second embodiment.

First, an administrator of the system replaces the PCI card 1007 when the application server 1 is in operation (FIG. 15: step S41). Incidentally, a block of the step S41 in FIG. 15 is represented by a dashed line because the step S41 does not represent the operation of the application server 1.

When the PCI card 1007 is replaced, the PHP controller 1013 outputs an interrupt that notifies the OS 1200 that the PCI card 1007 has been replaced. Here, the interrupt detector 1105 in the virtualization layer 1100 detects the interrupt (step S43). In the step S43, the OS 1200 does not receive the interrupt because the interrupt detector 1105 hooks the interrupt. The interrupt detector 1105 instructs the slot power controller 1109 and the acquisition unit 1107 to perform processing when the interrupt detector 1105 detected the interrupt.

When the slot power controller 1109 is instructed to perform the processing from the interrupt detector 1105, the slot power controller 1109 controls the PHP controller 1013 and powers on a PCI slot on which the PCI card 1007 after the replacement was mounted (step S45).

The acquisition unit 1107 acquires information related to the PCI card 1007 after the replacement when the acquisition unit 1107 is instructed to perform the processing from the interrupt detector 1105 (step S47). In the step S47, the acquisition unit 1107 acquires identification information of the slot on which the PCI card 1007 after the replacement was mounted, identification information of a port on the PCI card 1007 after the replacement, and a type of the PCI card 1007 after the replacement. Moreover, the acquisition unit 1107 outputs acquired information to the manager 1015.

And, the manager 1015 transmits the address extraction request that includes the information related to the PCI card 1007 after the replacement and the identification information of the application server 1 to the management server 9 (step S49).

The table manager 91 in the management server 9 receives the address extraction request from the application server 1 (step S51). Moreover, the management server 9 extracts, from the management table storage unit 93, a virtual MAC address or a virtual WWN associated with a combination of the identification information of the application server 1, the identification information of the PCI slot on which the PCI card 1007 after the replacement was mounted, the identification information of the port on the PCI card 1007 after the replacement, and the type of the PCI card 1007 after the replacement (step S53). Processing moves to step S55 in FIG. 16 by way of terminals A and B.

Figure 16:
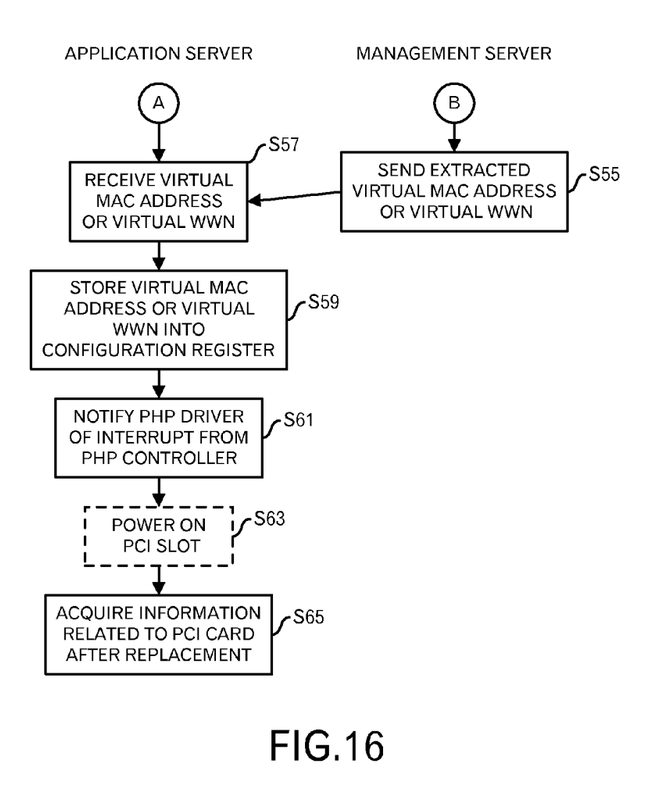
FIG. 16 is a diagram depicting a processing flow of processing performed in the system of the second embodiment.

Moving to an explanation of FIG. 16, the table manager 91 transmits the extracted virtual MAC address or virtual WWN to the application server 1 (step S55).

The manager 1015 in the application server 1 receives, from the management server 9, a virtual MAC address or a virtual WWN (step S57). And the manager 1015 outputs the received virtual MAC address or the virtual WWN to the setting unit 1101.

The setting unit 1101 stores the received virtual MAC address or virtual WWN into a predetermined area of the configuration register 1009 of the PCI card 1007 after the replacement (step S59).

The setting unit 1101 notifies the interrupt notification unit 1103 that the setting to the configuration register 1009 has been finished. Accordingly, the interrupt notification unit 1103 outputs the interrupt detected by the interrupt detector 1105 to the PHP driver 1201 in the OS 1200 (step S61).

Here, the PHP controller 1013 tries to power on the slot on which the PCI card 1007 after the replacement was mounted (step S63). However, in this embodiment, a state of the slot does not change because the slot was already powered on in the step S45. Therefore, a block of the step S63 in FIG. 16 is represented by a dashed line.

And the PHP driver 1201 acquires information related to the PCI card 1007 after the replacement (step S65). Then processing ends. Substance of the step S65 is the same as the substance of the step S47, however, the step S47 is processing in which the virtualization layer 1100 acquires information and the step S65 is processing in which the OS 1200 acquires information.

As described above, by introducing the management server 9 that manages virtual MAC addresses and virtual WWNs in an integrated fashion, it becomes possible to avoid arranging, for each server, a mechanism for managing virtual MAC addresses and virtual WWNs.

Although the embodiments of this invention were explained, this invention is not limited to the embodiments. For example, the functional block configurations of the aforementioned application server 1, storage server 5 and management server 9 may not always correspond to program module configurations.

Moreover, as for the processing flow, as long as the processing results do not change, the turns of the steps may be exchanged or the steps may be executed in parallel.

Incidentally, in the second embodiment along with the first embodiment, a virtual MAC address or a virtual WWN may be set to the configuration register 1009 only if a type of the PCI card 1007 is the same between before and after the replacement.

Moreover, the manager 1015 in the application server 1 is realized as hardware in the aforementioned example. However, the manager 1015 in the application server 1 may be realized as software.

Furthermore, although a PCI card is used in the aforementioned example, the embodiments cannot be applied only to the PCI card but also to other function expansion card or function expansion device.

Figure 17:
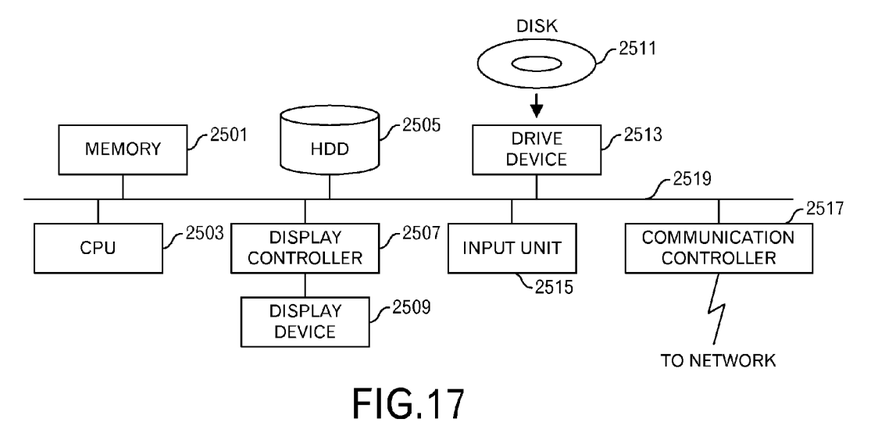
FIG. 17 is a functional block diagram of a computer.

In addition, the aforementioned storage server 5 and management server 9 are computer devices as illustrated in FIG. 17. That is, a memory 2501 (storage device), a CPU 2503 (processor) a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 17. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The embodiments described above are summarized as follows:

An information processing apparatus relating to a first aspect of the embodiment includes (A) a data storage unit to store a virtual address (For example, a virtual MAC address or a virtual WWN in the embodiments) in association with first information that includes at least identification information of a slot; and (B) circuitry. And the circuitry is configured to; (b1) detect an interrupt that notifies an operating system that a first PCI (Peripheral Components Interconnect) card was replaced, wherein the interrupt is output from a second PCI card by which the first PCI card was replaced on a certain slot; (b2) extract, from the data storage unit, a virtual address associated with first information that includes identification information of the certain slot, upon detecting the interrupt; and (b3) set the second PCI card so as to communicate using the extracted virtual address.

By employing the aforementioned configuration, it becomes possible, to prevent a communication problem that occurs after a PCI card of an information processing apparatus in operation is replaced.

Furthermore, the first information may further include identification information of a port. And the circuitry may be configured to (b2-1) extract, from the data storage unit, a virtual address associated with first information that includes the identification information of the certain slot and identification information of a port on the second PCI card. By employing the aforementioned configuration, it becomes possible to deal with a case in which there are plural ports on a PCI card.

Furthermore, the first information may further include a type of a PCI card. And the circuitry may be configured to (b2-2) extract, from the data storage unit, a virtual address associated with first information that includes the identification information of the certain slot, the identification information of the port on the second PCI card and a type of the second PCI card. By employing the aforementioned configuration, it becomes possible to deal with a case in which there are plural types of PCI cards.

Furthermore, the circuitry may be further configured to (b4) power on the certain slot; and (b5) acquire the identification information of the certain slot. By acquiring identification information of a slot, extracting a virtual address is performed properly.

Furthermore, the circuitry may be further configured to (b6) output the interrupt to the operating system after setting the second PCI card. It becomes possible to prevent a unique physical address of a PCI card after replacement from being used.

Furthermore, the circuitry may be configured to store the virtual address into a predetermined area in a register of the second PCI card. By employing the aforementioned configuration, it becomes possible for an operating system to refer to a virtual address of a PCI card.

Furthermore, the PCI card may be a LAN (Local Area Network) card or a FC (Fibre Channel) card, and the virtual address may be a virtual MAC address or a virtual WWN (World Wide Name). By doing this, it becomes possible to deal with a system using a MAC address or a WWN in communication.

An information processing apparatus relating to a second aspect of the embodiment includes: (C) a memory; and (D) a processor configured to use the memory and execute a process, the process including; (d1) detecting an interrupt that notifies an operating system that a first PCI (Peripheral Components Interconnect) card was replaced, wherein the interrupt is output from a second PCI card by which the first PCI card was replaced on a certain slot; (d2) transmitting identification information of the certain slot and identification information of the information processing apparatus to a management apparatus that manages a data storage unit that stores a virtual address in association with first information that includes at least identification information of a slot and identification information of an apparatus, upon detecting the interrupt; and (d3) upon receiving a virtual address associated with first information that includes the identification information of the certain slot and the identification information of the information processing apparatus, setting the second PCI card so as to communicate using the received virtual address.

By employing the aforementioned configuration, it becomes possible to prevent an information processing apparatus from managing a virtual address.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a memory to store a virtual address in association with first information that includes at least identification information of a slot; and
a processor configured to execute a process of a virtualization layer on which an operating system operates, the process comprising:
keeping an interrupt that notifies the operating system that a first PCI (Peripheral Components Interconnect) card was replaced from reaching the operating system, wherein the interrupt is output from a second PCI card by which the first PCI card was replaced on a certain slot;
extracting, from the memory, a virtual address associated with first information that includes identification information of the certain slot, while the interrupt is kept from reaching the operating system; and
setting the second PCI card so as to communicate using the extracted virtual address, while the interrupt is kept from reaching the operating system.

2. The information processing apparatus as set forth in claim 1, wherein the first information further includes identification information of a port, and
the extracting comprises extracting, from the memory, a virtual address associated with the first information that includes the identification information of the certain slot and identification information of a port on the second PCI card.

3. The information processing apparatus as set forth in claim 2, wherein the first information further includes a type of a PCI card, and
the extracting comprises extracting, from the memory, a virtual address associated with first information that includes the identification information of the certain slot, the identification information of the port on the second PCI card and a type of the second PCI card.

4. The information processing apparatus as set forth in claim 1, wherein the process further comprises:
powering on the certain slot; and
acquiring the identification information of the certain slot.

5. The information processing apparatus as set forth in claim 4, wherein the process further comprises outputting the interrupt to the operating system after setting the second PCI card.

6. The information processing apparatus as set forth in claim 1, wherein the setting comprises storing the virtual address into a predetermined area in a register of the second PCI card.

7. The information processing apparatus as set forth in claim 1, wherein the first PCI card and the second PCI card are LAN (Local Area Network) cards or FC (Fibre Channel) cards, and the virtual address stored in the memory is a virtual MAC address or a virtual WWN (World Wide Name).

8. An information processing apparatus, comprising:
a processor configured to execute a process of a virtualization layer on which an operating system operates, the process comprising;
keeping an interrupt that notifies the operating system that a first PCI (Peripheral Components Interconnect) card was replaced from reaching the operating system, wherein the interrupt is output from a second PCI card by which the first PCI card was replaced on a certain slot;
transmitting identification information of the certain slot and identification information of the information processing apparatus to a management apparatus that manages a data storage that stores a virtual address in association with first information that includes at least identification information of a slot and identification information of an apparatus, while the interrupt is kept from reaching the operating system; and
upon receiving a virtual address associated with first information that includes the identification information of the certain slot and the identification information of the information processing apparatus, setting the second PCI card so as to communicate using the received virtual address, while the interrupt is kept from reaching the operating system.

9. An information processing method for a virtualization layer on which an operating system operates, comprising;
keeping, by using a processor, an interrupt that notifies the operating system that a first PCI (Peripheral Components Interconnect) card was replaced from reaching the operating system, wherein the interrupt is output from a second PCI card by which the first PCI card was replaced on a certain slot;

extracting, by using the processor and from a data storage that stores a virtual address in association with first information that includes at least identification information of a slot, a virtual address associated with first information that includes identification information of the certain slot, while the interrupt is kept from reaching the operating system; and setting, by using the processor, the second PCI card so as to communicate using the extracted virtual address, while the interrupt is kept from reaching the operating system.

* * * * *